(12) United States Patent
Kossmann et al.

(10) Patent No.: US 9,372,667 B2
(45) Date of Patent: Jun. 21, 2016

(54) ONTOLOGY DRIVEN REQUIREMENTS ENGINEERING SYSTEM AND METHOD

(75) Inventors: Mario Kossmann, Bristol (GB); Mohammed Odeh, Bristol (GB)

(73) Assignees: AIRBUS OPERATIONS LIMITED, Bristol (GB); UNIVERSITY OF THE WEST OF ENGLAND BRISTOL, Bristol (GB)

( * ) Notice: Subject to any disclaimer, the term of this patent is extended or adjusted under 35 U.S.C. 154(b) by 465 days.

(21) Appl. No.: 13/364,603

(22) Filed: Feb. 2, 2012

(65) Prior Publication Data

US 2013/0205190 A1   Aug. 8, 2013

(51) Int. Cl.
*G06F 17/21* (2006.01)
*G06F 9/44* (2006.01)
*G06F 17/30* (2006.01)

(52) U.S. Cl.
CPC ............ *G06F 8/10* (2013.01); *G06F 17/30734* (2013.01)

(58) Field of Classification Search
CPC ..................................................... G06F 17/243
USPC ........................................................... 715/225
See application file for complete search history.

(56) References Cited

U.S. PATENT DOCUMENTS

| | | | |
|---|---|---|---|
| 7,831,453 B2 * | 11/2010 | Das et al. ...................... 705/7.27 |
| 8,429,179 B1 * | 4/2013 | Mirhaji ......................... 707/756 |
| 2003/0182470 A1 * | 9/2003 | Carlson et al. ................ 709/328 |
| 2012/0143570 A1 * | 6/2012 | Austin et al. ..................... 703/1 |
| 2012/0166929 A1 * | 6/2012 | Henderson et al. ........... 715/224 |

* cited by examiner

*Primary Examiner* — Laurie Ries
*Assistant Examiner* — Zaida I Marrero
(74) *Attorney, Agent, or Firm* — Hauptman Ham, LLP

(57) ABSTRACT

A computer system comprising a processor and memory, wherein the system is programmed to provide a metamodel comprising a plurality of predefined fields relating to requirements engineering and ontological relationships between at least some of the predefined fields, and is programmed to prompt a user to enter information into the predefined fields in order to create a requirements specification.

34 Claims, 17 Drawing Sheets

ONTOLOGY DRIVEN REQUIREMENTS ENGINEERING SYSTEM AND METHOD

FIELD OF INVENTION

The present invention relates to a computer system and method which provides improvements to requirements engineering and tools for requirement engineering. In particular the invention relates to an ontology-driven requirements engineering methodology and apparatus.

BACKGROUND TO THE INVENTION

Requirements engineering and management aims to aid the development of products or services in an industry and to the subsequent management of the products or services through their entire life-cycle. Computer implemented tools are known for use in requirements engineering which are intended to improve the requirements engineering process and thereby both the ultimate product or service, and the efficiency of their development.

The requirements engineering or management process typically involves determining the problem to be met and communicating the problem to the various relevant parties such as stakeholders, analyzing the requirements and determining the solution whilst taking into account the varying, often conflicting, needs of the relevant parties.

The process is often used in large scale engineering projects, for example those associated with aircraft development.

Commercially available software programs are available to help with the requirements engineering process. There are a number of problems with existing processes and tools. Such problems include the inclusion of a large number of duplications in particular where a large number of requirements are produced, which leads to increased cost. Furthermore known systems fail to produce a systematic method for re-using the requirements resulting in requirements that have had insufficient prior analysis and therefore are of low quality. Other problems include the maintenance of requirements traceability, the slow and/or laborious removal of duplications, the inefficiencies and slowness of the generation of requirements, difficulties in changing requirements, the difficulties and inconsistent ability to re-use requirements whether as part of the same product/service development or for use in a new development. Further existing systems give little guidance as to how close to completion the development process is and how many necessary or desirable stages of the requirements engineering process have been completed.

Some problems including some of those named above result from existing processes of requirements engineering whilst some result from deficiencies in existing computer implemented tools and others result from a combination of the processes and tools.

In the context of the aerospace industry, there are several different interested parties or "actors", who may be spread across many different organizational sites, cultures, countries, time zones and languages. Such a global network is a highly complex network which typically has multiple layers of suppliers and contractors and risk sharing partners or stake holders whose requirements will need to be considered. In such large scale projects the long lead time, high costs and the highly complex nature of these products with very long life-cycles need to be considered, often resulting in a higher cost for the projects. Accordingly, in such situations the requirements of the system process and all actors must be considered in order to return an optimal solution. Furthermore, in such large scale projects there may be a high number of different requirements resulting in extensive duplication. These duplications further result in increased time and costs. Due to the lack of consideration when reusing previous requirements, the returned requirements are often of a lower quality. This further results in an increase in development time, the need to repeat the requirements engineering process, increase in overall project duration and further increase in costs. Yet another problem associated with prior tools and processes is that mutability of requirements is not explicitly allowed for. Any changes within the requirements in general lead to substantial corrective rework, i.e. repetition of parts of the requirements engineering process, and subsequent development processes such as the design and testing processes, resulting in significant delays, increased cost, and poor resource management.

At least some embodiments of the invention mitigate at least some of the above mentioned problems. In particular the provision of an ontological metamodel mitigates one or more of the above problems.

According to an aspect of the invention there is provided a computer system comprising a processor and memory, wherein the system is programmed to provide a metamodel comprising predefined fields relating to requirements engineering, and ontological relationships between the predefined fields, to receive an ontology relating to at least one domain or topic, to adapt one or more predefined field or ontological relationship based on the received ontology, and to prompt a user to enter information into the predefined fields in order to create a requirements specification and/or the steps for creating a requirements specification.

According to an aspect of the invention there is provide a computer system comprising a processor and memory, wherein the system is programmed to provide a metamodel comprising a plurality of predefined fields relating to requirements engineering, and (preferably ontological) relationships between at least some of the predefined fields, and to enable, and preferably to prompt, a user to enter information into the predefined fields in order to create a requirements specification and/or the steps for creating a requirements specification.

Preferably the metamodel comprises a plurality of templates for the creation of an instance, each template for an instance comprising at least two predefined fields. More preferably the metamodel comprises one or more (preferably predefined) class, at least one of (optionally each of) the classes comprising a template for the creation of at least one instance, the system programmed to enable/prompt a user to create a plurality of instances for each class using the template of that class. Two or more (or each) instances in a at least one (or each) class can contain at least two (or most/all) predefined fields which are the same/relate to the same aspects of requirements engineering and which are common to the template belonging to that class.

Preferably templates of at least two (or each) different classes contain at least one (or most/all) predefined fields which are different from each other and/or relate to different aspects of requirements engineering.

Preferably the metamodel comprises/defines at least one class comprising a plurality of sub classes, at least two sub classes having different templates for instances.

The metamodel may comprises one or more (and preferably a plurality of) hierarchies of classes comprising a parent class and child class, the system programmed to enable a user to create instances for each child class which is derived from an instance of a parent class.

Relationships can include one or more relationships between a field of a first template of a first class and at least a part of a second different class. More preferably the portion of a second class comprises a predefined field of a second template, which second template belongs to the second class.

The system can be programmed to enable/prompt a user to enter a reference to one or more of: a second instance and a completed predefined field of a second instance into a first predefined field of a first instance. Preferably the first and second instances are built from different templates/belong to different classes and/or the system is programmed to automatically enter information into a field in the second instance in response to the user entering the reference in the first predefined field of the first instance.

A plurality of classes may relate to roles of people involved in requirement engineering. One or more of the classes relating to roles can comprise a plurality of sub classes stating predefined roles and/or the class itself may state a predefined role.

Predefined roles can include one or more of: development team stakeholder, end user stakeholder, requirements engineer and ontology manager. Preferably wherein the user is enabled or prompted to create different numbers of instances for different roles.

A plurality of classes may relates to steps for creating a requirements specification. At least some of the classes that relates to steps for creating a requirements specification may comprise sub classes defining predefined workflows. Some of the predefined workflows may comprise sub classes defining predefined activities which each comprise a template for creation of instances.

A plurality of classes may relate to a solution space relating to a requirement specification. Preferably there are the parent and/or child classes of the class relating to a solution space which include one or more of: goals, soft goals and requirements. At least one (or each) template or some of the predefined fields of the at least one (or each) template of a requirements child class when completed by at least one user make up (at least part of) a requirement specification. At least one (or each) template for instances of a goal or soft goal can comprise a predefined field which has a relationship with a different template/class and for which a user is prompted to enter a reference to a specific (at least partially complete) instance of the requirement sub class which is derived from that instance of a goal or soft goal. Preferably goals are functional and soft goals are non-functional.

A plurality of classes may relate to a problem space relating to a requirement specification. Preferably at least some of the classes relating to a problem space comprise sub classes relating to needs of the requirement engineering. One or more (or each) template for instances of goals or soft goals can comprise a predefined field which has a relationship with a different template/class and for which a user is prompted to enter a reference to a specific (at least partially complete) instance of the need sub class from which that instance of goal is derived.

The predefined fields can be semantically linked within the metamodel by means of one or more of object and datatype properties. Preferably the property of the field constrains the type of information that a user can enter into that field and/or the property of the field constrains which instances can be referenced by a user in that field.

The system may be programmed to receive an ontology relating to at least one domain or topic, and to adapt one or more predefined field or ontological relationship based on the received ontology.

The computer system of one of the above mentioned aspects or a different computer system comprising a processor and a memory, may be programmed to use an at least partially completed requirements specification or requirement engineering steps (preferably created using a system of one of the above aspects) and is programmed to:

search instances for predefined fields that are empty or incomplete and display to a user a list of empty or incomplete fields, preferably providing navigational links to the empty or complete fields; and/or search predefined fields of instances of one or more of needs, requirements and goals for duplications and to display to a user the results of the search; and/or search predefined fields of instances of one or more of needs, requirements and goals for conflicts and to display to a user the results of the search; and/or automatically compile at least part of a requirements specification from information that a user has entered into a set of the predefined fields.

such that in response to the selection of an instance it presents one or more completed fields or summaries of instances that relate to the selected instance by using the relationships between fields in the metadata and information entered by the user into at least one field outside of the selected instance;

such that in response to the selection of an instance of a requirement it presents one or more completed fields or summaries of instances of a need or goal which it satisfies;

such that in response to the selection of an instance of a need it presents one or more completed fields or summaries of instances of a requirement or goal which are derived from it.

According to an aspect of the invention there is provided a computer enabled method, the method comprising the steps of: populating a metamodel comprising a plurality of predefined fields relating to requirements engineering, and (ontological) relationships between at least some of the predefined fields, and creating a requirements specification and/or the steps for creating a requirements specification using the metamodel.

According to an aspect of the invention there is provided a computer enabled method, the method comprising the steps of: searching an at least partially completed metamodel for desired results, the metamodel comprising a plurality of predefined fields relating to requirements engineering, and (ontological) relationships between at least some of the predefined fields, and presenting desired results in the form of information that has been populated in the predefined fields by using the relationships between some of the predefined fields to present.

The method(s) may include any step(s) corresponding to any of the feature described above in relation to a computer system in accordance with an aspect of the invention.

Other aims and aspects of the invention will become apparent from the appended claim set.

BRIEF DESCRIPTION OF THE DRAWINGS

Embodiments of the invention will now be described, by way of example only, with reference to the accompanying drawings in which.

DETAILED DESCRIPTION OF AN EMBODIMENT

There is provided an ontology based, knowledge driven approach to Requirements Engineering (RE). An approach consists of four separate stages of elicitation, analysis and negotiation, documentation and validation.

Figure 1:
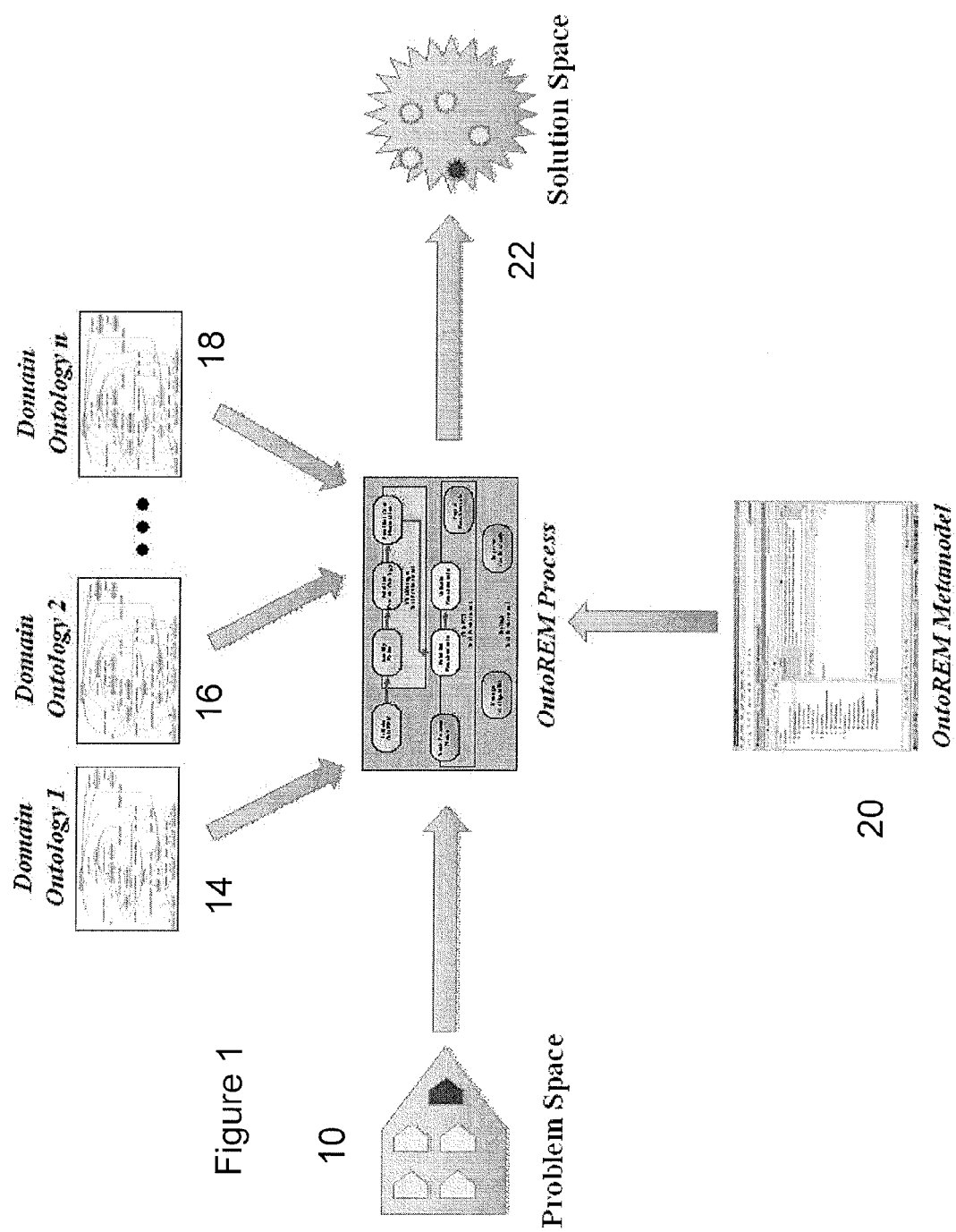
FIG. 1 shows a diagram in relation to Requirements Engineering according to an aspect of the invention.

FIG. 1 describes a data flow diagram used in RE according to an aspect of the invention. There is shown the problem space 10, ontological RE process 12, domain ontologies 14, 16, 18, ontological metamodel 20, and output solution space 22.

In use, one or more users define the problem space 10 by listing the domain specific business processes, actors and concerns of a project or system. When an existing problem space specification exists the constraints of the problem space are inputted to the ontological RE process 12. Various domain ontologies 14, 16, 18 are used to define the ontologies for the project. In particular the actors, goals, requirements and links between them are defined at this level. A metamodel 20 is used which structures the input across the various actors so that they populate the requirements and ontologies in a consistent manner. The domain ontologies 14, 16, 18 and metamodel 20 are inputted to the RE process as well as helping to define the solution space 22. When there is no existing problem space for the RE project (e.g. if it is an entirely new project) the problem space 10 is also developed using the ontological RE process 12 and metamodel 20.

Figure 2:
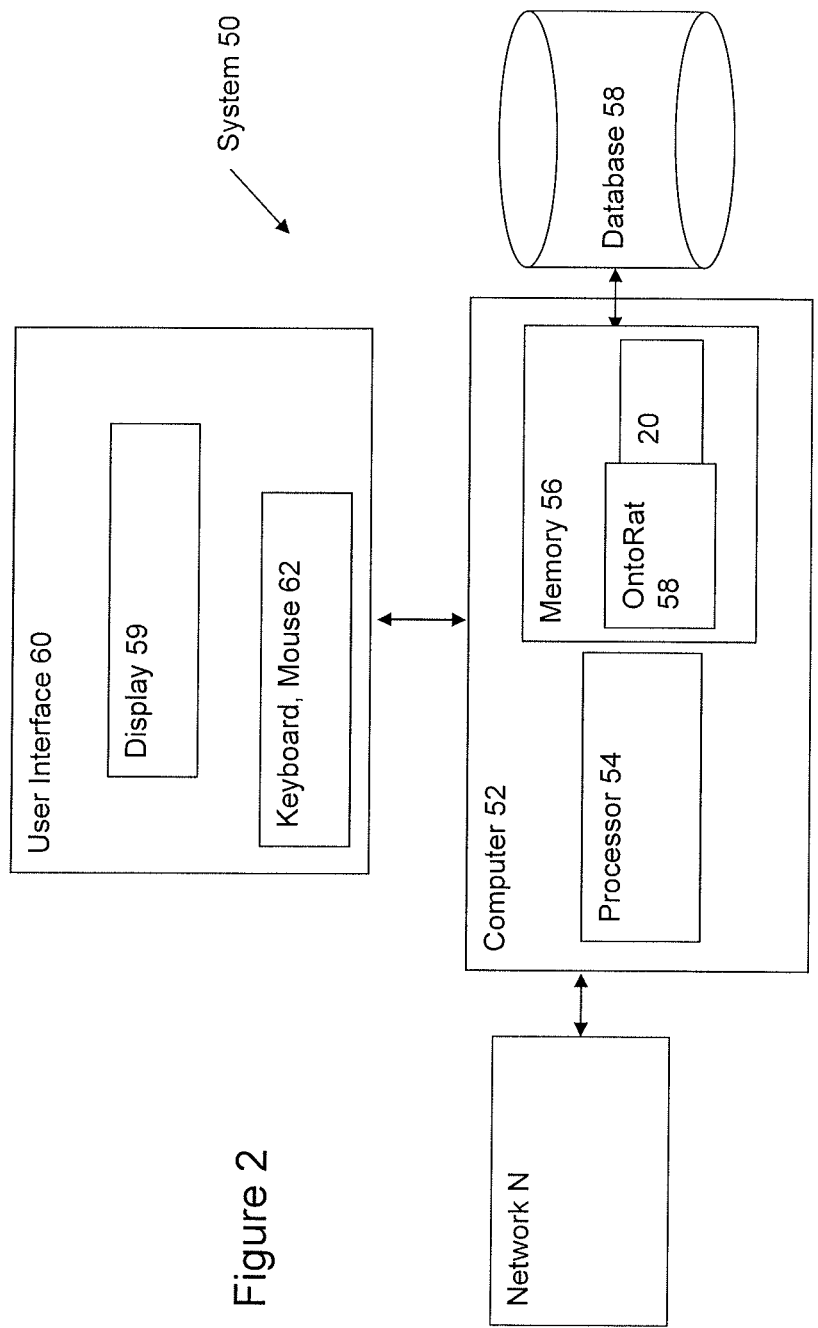
FIG. 2 shows computer apparatus programmed in accordance with an embodiment of the invention.

In FIG. 2 there is shown, a system 50. System 50 includes a computer 52, comprising a processor 54, and a memory 56. There is also shown a user interface 58, comprising for example a mouse and a keyboard. The computer 52 is in communication with a network N from which it can receive inputs and an external database 58. Alternatively database 58 may be internal.

The computer 52 may be any known computer device such as a personal computer, desktop computer, laptop computer etc. The computer 52 may be connected as part of a network of computers or as a standalone computer device. The database 58 may be local to the computer and/or distributed across the network N. The network N may represent a wired or wireless network of computers or the Internet.

The memory 56 includes the metamodel 20 and software referred to as OntoRAT 58 that can be run on a completed or semi-completed ontological RE specification based on the metamodel 20.

Figure 3:
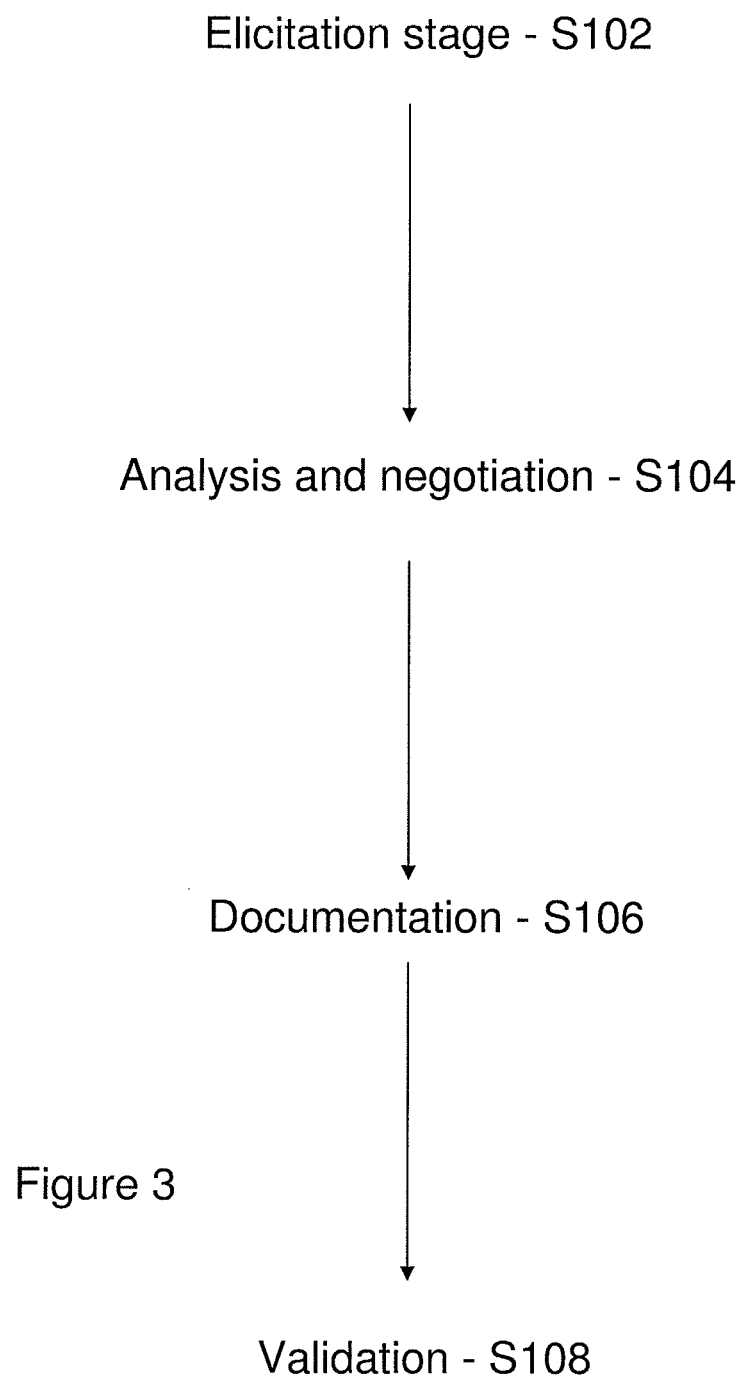
FIG. 3 is a representation of part of a process ontology shown in FIG. 1.

FIG. 3 is a flow chart of part of the process 12. There is shown an elicitation stage S102, analysis and negotiation S104, documentation S106 and validation S108.

The elicitation stage S102 represents the process of gathering the required information for the project from all actors/various parties (such as stakeholders, partners, subcontractors etc.). The purpose of the elicitation stage is to explore the underlying "real" needs of the relevant stakeholders and provide a common understanding between all parties so that the various requirements of each party can be identified and specified during the requirements engineering process.

In the elicitation stage, the problem 10 and solution 20 spaces are explored and defined. The explicit definition of the problem and solution spaces will enhance the specification of the domain requirements that express the problems to be solved and any constraints on the solutions that may be developed or selected to solve these problems. The latter may include relevant safety, budget, schedule and process requirements to be met, whereas the former may include functional, performance and quality requirements of a system to be developed. In particular, in this stage the identification of the needs, goals/soft goals and requirements for each party are identified. In the present invention, the elicitation stage also involves the creation of a central domain knowledge repository or repositories, and the ability to reuse any previous requirements. Further details regarding the elicitation stage, and the problem solution space, are discussed below.

The second stage, analysis and negotiation S104, involves the automated analysis of the specified problem and solution spaces in the form of ontologies at need, goal and requirements level; i.e. the high level needs (part of the problem space), the corresponding goal hierarchies (first part of the solution space) and the specified requirements (second part of the solution space) are analyzed for completeness and consistency—both each need goal and requirement individually, and as a set in its entirety.

"Need" is used as an expression of something that has to be provided, ensured, or avoided by a system or the development project of this system; from the viewpoint of one or several stakeholders. Needs are part of the specified problem space of a given domain or project, they summarize the problems to be solved. Each need, if followed up, will lead to the development of a goal hierarchy.

A goal is an (often functional) expression of how one or several aspects of an identified need are intended to be satisfied. "Soft-goals" are often non-functional and usually do not have a clear-cut criterion for their satisfaction.

A requirement is a detailed expression of specific aspects of a less detailed stakeholder need, via the elaborated root goals of the latter. It formalizes a relationship between one or several stakeholders and the developer of a system. Requirements are most frequently expressed as textual requirements, but in some areas such as safety critical software requirements, formal requirements or models may be used. Requirements are descriptions of how a system should behave (functional requirements), or of an overall system property or attribute (non-functional requirements). They may be a constraint on the development process, and on the program or project by which the system in question will be developed or modified A goal hierarchy is a hierarchy of goals (functional goals and/or non-functional soft goals) that are derived from each need of the problem space. Within such a goal hierarchy, a goal is considered to be satisfied when all its derived sub-goals are satisfied. Those goals that cannot further be broken down into sub-goals are called root goals or root soft goals. Requirements will usually be established for each root goal and root soft goal only, not for any other goals that are not root goals. If all root goals and root soft goals within a goal hierarchy are satisfied, the underlying need of this goal hierarchy is considered to be satisfied.

During the analysis and negotiation stage the identification of inconsistencies, duplications and conflicts between needs, between goals and between requirements can occur. Furthermore, during this stage any missing goals and requirements are identified by means of traceability analysis within the domain ontology. It is highly desirable that any incompleteness is addressed, as the absence of any of the aforementioned features typically results in poor quality solutions, and invariably necessitate the need for repeating part of the process. Finally, issues regarding the quality regarding the structure and content of the goals and requirements are also identified.

The documentation step S106 involves the creation of instances of the classes need, goal/soft-goal, and requirement in the domain ontology. Via the relationships of these classes and their information attributes or components as defined in the domain ontology, each such instance of a class functions as a template for the users of system 50 to be able to write needs, goals and requirements, and complete all related, information such as attribute information and links to instances of other classes. Allowable links, and in certain cases specific, pre-defined values the users can select from a drop-down list are defined in the domain ontology which can be based on the Ontology Web Language (OWL) standard.

The final stage of the methodology that is illustrated in FIG. 3 is the validation stage S108 in which the resulting domain requirements (i.e. the second part of the solution space provided by the ontology-driven requirements engineering methodology) are validated by the identified relevant stakeholders of the domain requirements. In particular, the solution space is compared with the original requirements regarding the completeness for each individual stakeholder/actor, quality criteria are assessed, completeness and consistency of the requirements are also assessed as well as providing a traceability of requirements within the domain ontology. The final solution provides the user with an RE methodology required to implement the project in a consistent and logical manner, in particular whilst minimizing/eradicating the duplication of efforts and ensuring that all needs are satisfied and goals are meet.

Metamodel 20 is provided which ensures a consistent approach to the requirement engineering process, in particular when defining the requirements of the project. The metamodel is an ontology based model which defines and specifies all relevant classes such as need, goal/soft-goal and requirement and their relationships in the RE process. The metamodel 20 allows the users to easily, and consistently, identify the needs, goals and requirements to be met for a particular project; identify any gaps and inconsistencies in the domain information; and enhance the planning stage and subsequent progress monitoring of the requirements development work.

In particular, the metamodel 20 defines a specification of the ontology-driven requirements in the requirement engineering methodology and specifically the underlying concepts in the RE domain, as well as the relationships between the domain requirements and related information objects such as the underlying goals/soft-goals and needs. The metamodel 20 is akin to a generic blueprint of the methodology. Advantageously, the metamodel allows for the methodology to be used consistently across a number of different problem spaces or domains. This has the advantage of allowing for the identification of duplications and previous optimal solutions.

The metamodel 20 also defines an ontology for the process. That is to say for each stage of the process 12, and the organization/enterprise within which the process 12 is implemented, the metamodel 20 provides a formal framework in which the information regarding the process 12 is inputted. In particular, the metamodel 20 provides the framework in which the actors are consistently identified, the goals/soft-goals are set, the requirements identified, as well as the relationships between all these various components are expressed, i.e. the traceability among all specified information objects.

Figure 4:
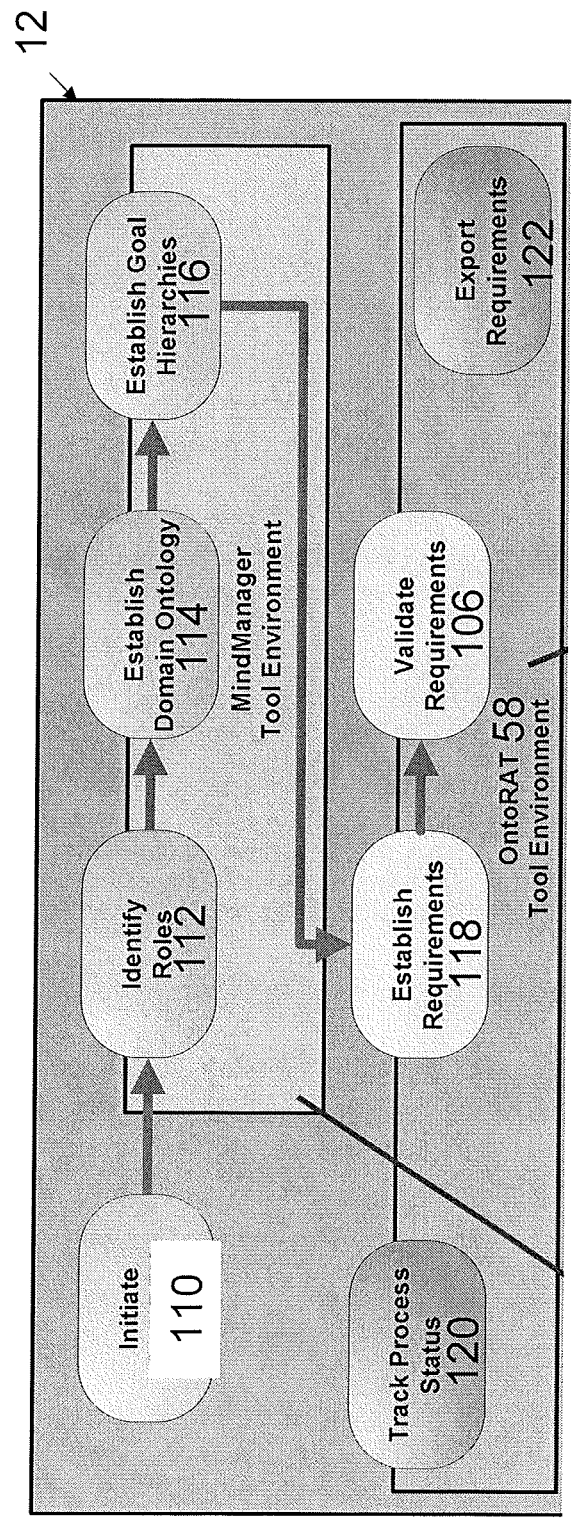
FIG. 4 shows a schematic representation of the process of FIGS. 1 and 3 in the context of supporting tooling environments.

FIG. 4 shows a schematic representation of the process 12 in the context of the supporting tooling environments as specified in the metamodel 20. The stages of the process 12 are specified as iterative and concurrent workflows rather than just individual steps of the process in a strictly sequential order. This consciously reflects the fact that the relevant stakeholders and domain experts, who needed to be met and worked with, are not always available at the convenience of the user of system 50 and also because, in case of conflicts or unavailability of relevant knowledge, problems will need to be resolved by revisiting activities that had already been performed.

The workflows "Initiate" 110, "Identify Roles" 112, "Establish Domain Ontology" 114 and "Establish Goal Hierarchies" 116 comprise sub-stages of elicitation stage S102 and allow a user to customize and start using metamodel 20 for a given project or program, build domain ontology 14 including high-level domain needs (problem space 10), develop goal hierarchies (goals and soft goals) and identify root goals and root soft goals from which requirements will be derived (first part of the solution space 22).

The workflows "Establish Requirements" 118 forms part of analysis and negotiation stage S104 and documentation stage S106 and encompasses the activities needed to elicit, analyze, and document requirements based on the available domain knowledge—i.e. the problem space and the first part of the solution space down to the goal level—thereby completing the solution space of the domain ontology down to the requirements level. Both theses stages and the "validation" stage S106 takes place in the domain ontology prior to any export of the domain requirements to a separate requirements management tool environment, if applicable. The reason for this is that validation is greatly enhanced by use of the OntoRAT tool 58 as will be described later.

The workflows "Track Process Status" 120 and "Export Requirements" 122 comprise activities needed to keep under control and guide the process 12, to export intermediary results from the domain ontology, and to continuously improve the entire methodology over time.

The metamodel 20 captures and manages reference knowledge and concepts in the generic domain of RE and one or several specific application domains, in order to develop high quality requirements for these specific application domains. The metamodel 20 is a generic model which can be used across a number of different domains, as the general structure of the ontology remains the same across any such domains.

In a preferred embodiment the metamodel is written using OWL DL, a known ontology language notation. The metamodel 20 can provide ontological relationships between fields or domains, into which domain ontologies 14, 16, 18 can be added and, provided the ontology content reflects accurate and recognized, current domain knowledge and concepts, it provides an efficient framework for the creation of an RE project. By allowing new domain ontologies 14, 16 and 18 to be added during the process rather than being already present in the metamodel 20, the relevant stakeholders can feel ownership of their domain ontology, be convinced of its usefulness and accept it as the reference regarding the knowledge and concepts contained in it.

Figure 5:
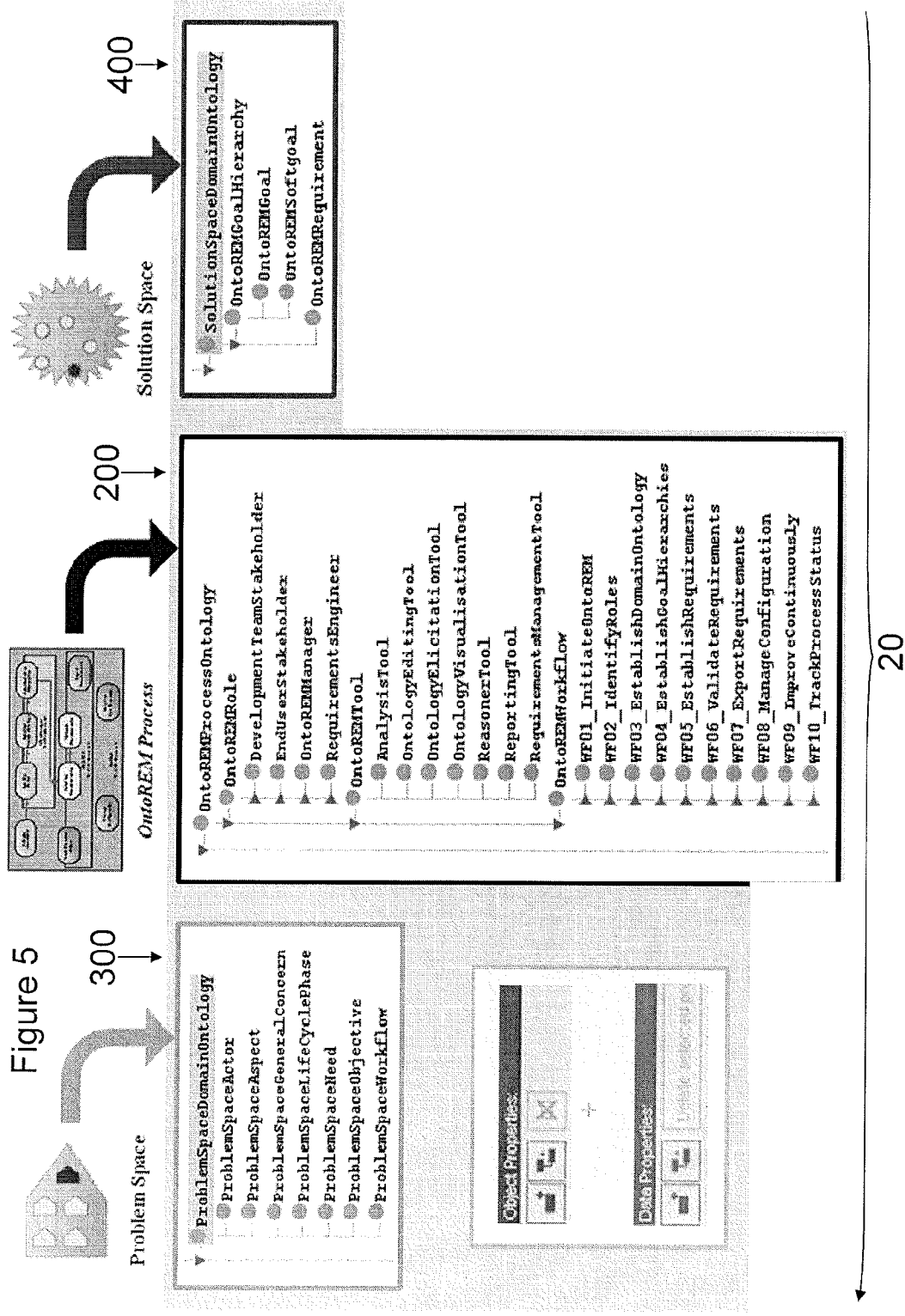
FIG. 5 depicts the metamodel shown in FIG. 1.

FIG. 5 depicts the metamodel 20 and illustrates it as defined in three parts, a process ontology 200, problem space ontology 300, and solution space ontology 400. FIG. 5 also indicates the interaction and connection between the different ontologies 200, 300, 400 of the metamodel 20 which is achieved by means of Object Properties and Data Properties.

The process ontology 200 contains the domain knowledge that specifies how to apply requirements engineering and management in generic terms.

Figure 6:
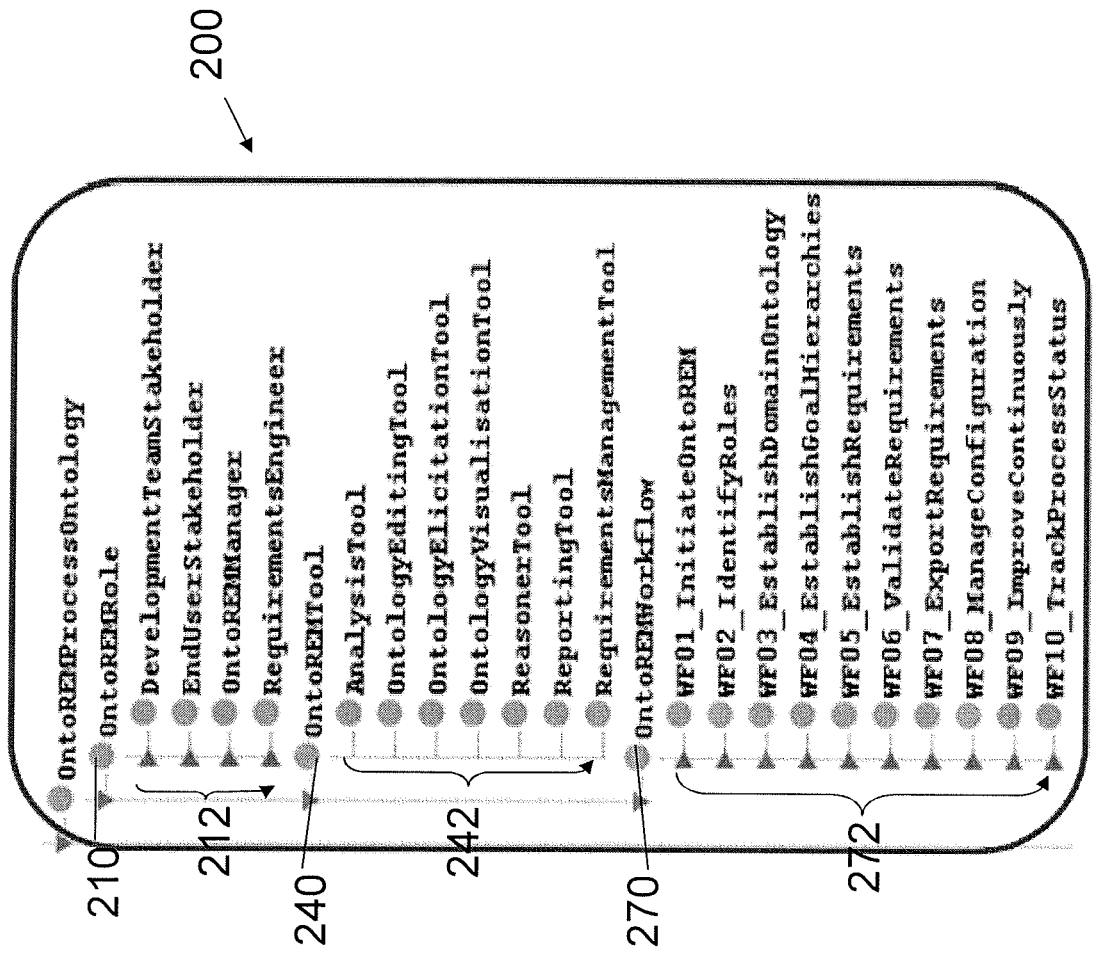
FIG. 6 shows a an overview of the process ontology of the metamodel of FIG. 5.

FIG. 6 shows a an overview of the process ontology 200 showing a role class 210, tool class 240 and workflow class 270 relating to an example of process 12. In this instance process 12 is related to an aerospace project. The roles class 210 includes a number of generic roles 212 covering the roles of stakeholders in the project subject to RE, the tool class 240 includes a number of tools 242 used in organising the RE methodology and the workflow class a number of workflows 272. The overview 200 also acts as an interface by which a user can navigate each class 210, 240 and 270 of the metamodel 20. By selecting a class by for example clicking with a mouse 62 more detail regarding the class 210, 240, 270 can be both viewed and interacted with.

Figure 7:
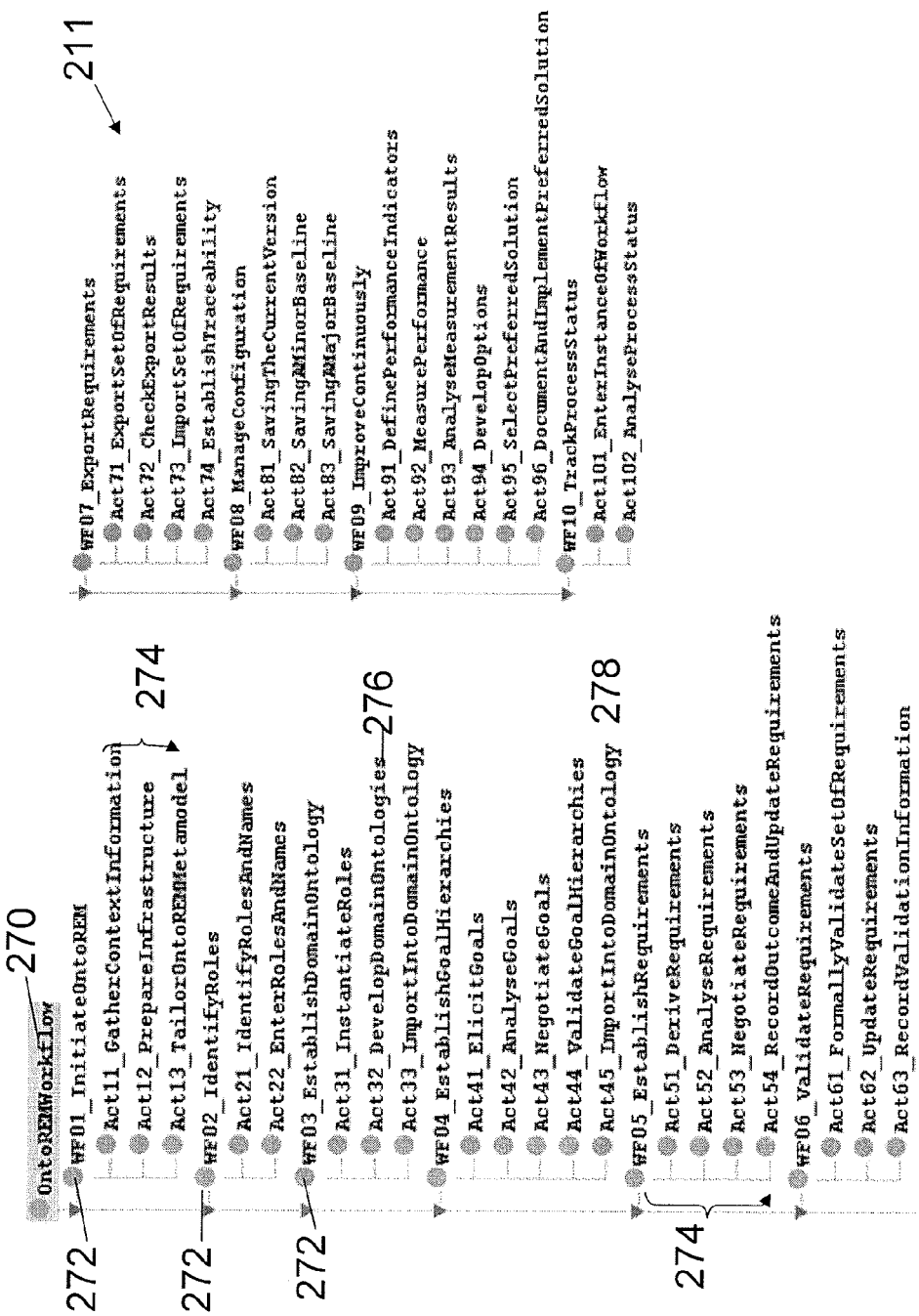
FIG. 7 shows an overview of the workflow class of the process ontology of FIG. 6.

The workflow class 270 comprises a number of subclasses specifying workflows of process 12. FIG. 7 shows an overview of the workflow class 270 showing the workflows 272 and their associated activities 274 which cover all of steps S102-S108. All workflows and activities, for example workflows 272 and activities 274 are named as imperatives, following the principles applied for the technical documentation of maintenance instructions in the aerospace industry. The overview 211 also acts as an interface by which a user of system 50 can navigate each activity. By selecting any activity 274 by for example clicking with a mouse 62 more detail regarding the activity 274 and instances related to it can be both viewed and/or edited.

Figure 8:
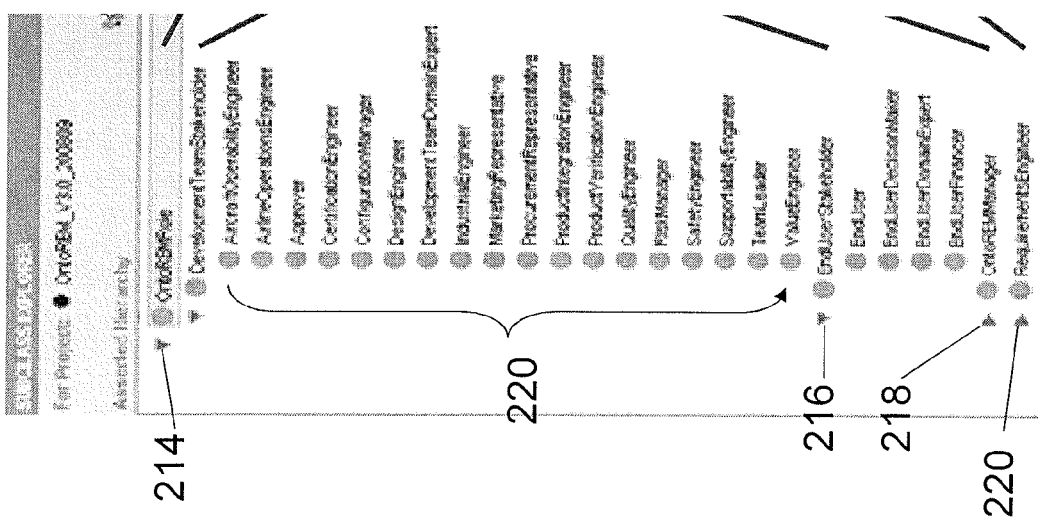
FIG. 8 shows an overview of the role class of the process ontology of FIG. 6.

The role class 210 comprises a number of subclasses which are each concept of roles of actors that will take part in the activities 274 of process 12. FIG. 8 shows an overview of the role class 210 showing all generic roles 212 and their associated generic sub-roles 222. The generic roles listed are "Development Team Stakeholder" 214, "End User Stakeholder" 216, "Requirements Engineer" 220 and "Ontology Manager" 218. A number of generic roles 222 are defined that can be performed by several people, or individuals that may perform several roles, or several people that may perform the same role. Also, there may be overlaps depending on the given organisational context in which metamodel 20 is to be applied using process 12.

"Development Team Stakeholder" 214 covers the stakeholders on the development team side, who have a vested interest in, influence on, or are concerned by the project to be developed. In contrast "End User Stakeholder" 216, covers the stakeholders on the end-user side, who have a vested interest in, influence on, or are concerned by the project to be developed.

"Ontology Manager" 218 may only include one role that implements, populates and then maintains the metamodel 20 using system 50. This can be distinguished from "Requirements Engineer" 220 that covers role(s) that conducts requirements development and requirements management over time.

Preferably, a distinction is made between relevant stakeholders and domain experts. The number of stakeholders is usually large, and accordingly only relevant stakeholders are considered, i.e. a sub-set of stakeholders that have formal responsibility for a specific domain in a given context. For example, a domain expert of a specific domain may have a viewpoint or expertise in that domain but may not necessarily be a stakeholder. On the other hand, some relevant stakeholders may not necessarily be domain experts of the domain at hand; this could be the case if the relevant stakeholder is new in his position. Such a stakeholder may be responsible to validate and sign off requirements without necessarily being an expert of the given domain. Due to the limited availability of relevant stakeholders and domain experts compounded by the lack of other resources, the process of domain ontology development is often both iterative and concurrent. The process 12 explicitly enables such iterative and concurrent work in a systematic manner therefore ensuring consistency and resulting in reduction of errors and duplications.

The overview also acts as an interface by which a user of system 50 can navigate each sub-role 222 or role 212. By selecting any sub-role 222 by for example clicking with a mouse 62 more detail regarding the sub-role 222 and instances related to it can be both viewed and/or edited.

The problem ontology 300 concerns the specification of the problem space of any application domain, in which the user develops and manages their domain requirements. For example the user may define overall objectives, parties involved, areas of concern, life cycle etc.

Figure 9:
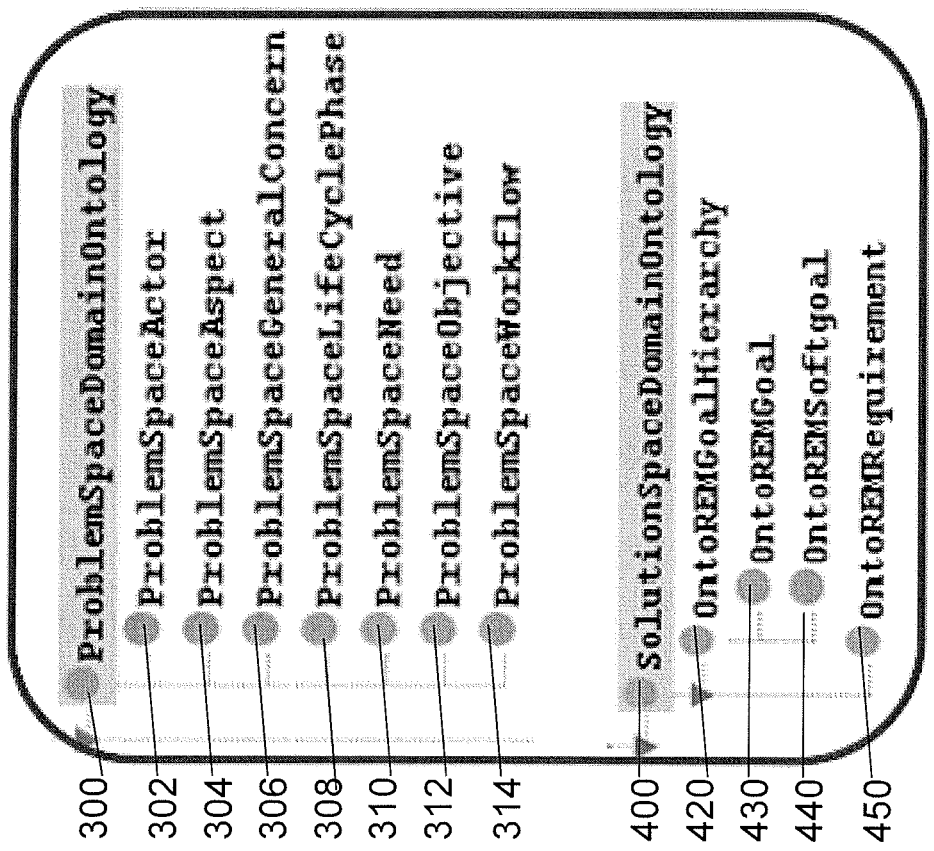
FIG. 9 shows a an overview of the problem and solution ontologies of the metamodel of FIG. 5.

The problem ontology 300 consists of the classes relating to each relevant person or actor in the problem space, aspect, general or global concerns regarding a problem, the global objective and local objectives, life cycle phase, requirements or needs, and workflow. FIG. 9 shows an overview of the problem ontology 300 showing a "Problem Space Actor" class 302, "Problem Space Aspect" class 304, "Problem Space General Concern" class 306, "Problem Space Life Cycle Phase" class 308, "Problem Space Need" class 310, "Problem Space Objective" class 312, and "Problem Space Workflow" class 314.

The solution ontology 400 of the metamodel 20 concerns the specification of the solution space of the application domain in question. In the solution space the user defines goals and soft goals and requirements. FIG. 9 also shows an overview of the solution ontology 400 showing class "Goal Hierarchy" 420, (with the sub-classes "Goals" 430 and "Soft Goals" 440), as well as the class "Requirement" 450.

Instances are to be created for all the generic sub-roles 222 as required for a given application. The participation of each individual actor in the process 12 is recorded by a user of system 50 and associated process knowledge used in order to conduct process status analyses using OntoRAT 58. Workflow activities 274 that require the involvement of relevant stakeholders or domain experts i.e. holders of sub-roles 222 and roles 212 are specified as such, and meetings can be recorded as instances of the activities 274.

The specified process steps and associated activities 274 are semantically linked within the metamodel 20 by means of object and datatype properties, as are all other described concepts of the metamodel 20 such as "Goal" 430 or "Requirement"450. This allows the creation of goal and requirements templates that are visualised in the ontology by means of a set of corresponding widgets when an instance is created or displayed.

The datatype properties of the metamodel 20 serve to specify the majority of the components of the requirements template such as attribute and link information, but also, very importantly, the sub-components of the requirement statement. These sub-components are automatically compiled by computer system 50 into the requirement statement on demand using the OntoRAT tool 58, in order to ensure a harmonised structure of all requirement statements.

Figure 10:
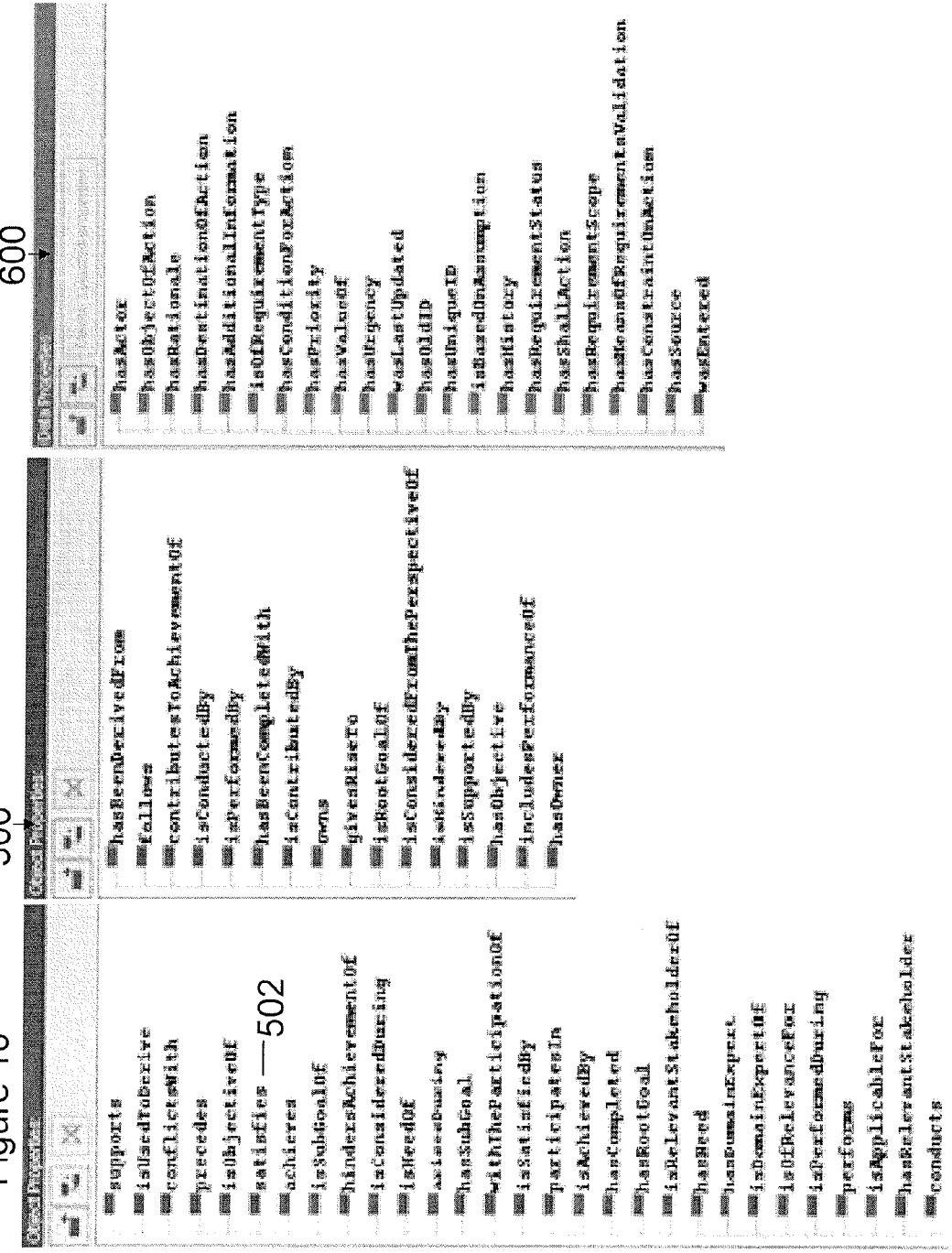
FIG. 10 provides an overview of object and datatype properties.

FIG. 10 provides an overview of the object properties 500 and datatype properties 600 of the metamodel 20 which are used to build template for relevant subclasses of the metamodel for example subclasses 218, 220, 302-314, 430, 440.

For example, the goal and requirement templates are built using both types of properties. When an instance of a goal or requirement is created, all specified properties are displayed as fields known as widgets in the corresponding template. A widget that is based on an object property such as "satisfies" 502 allows the user to pick from a list of instances of allowed classes in line with the defined range of that class. A widget that is based on a datatype property such as "has condition For Action" 602 allows the user to enter a string format text that described under which condition the specific requirement had to be satisfied. Depending on the property in question, information is either manually input into widgets or it is automatically entered based on other already completed instances and the relationship between classes and widgets.

Figure 11:
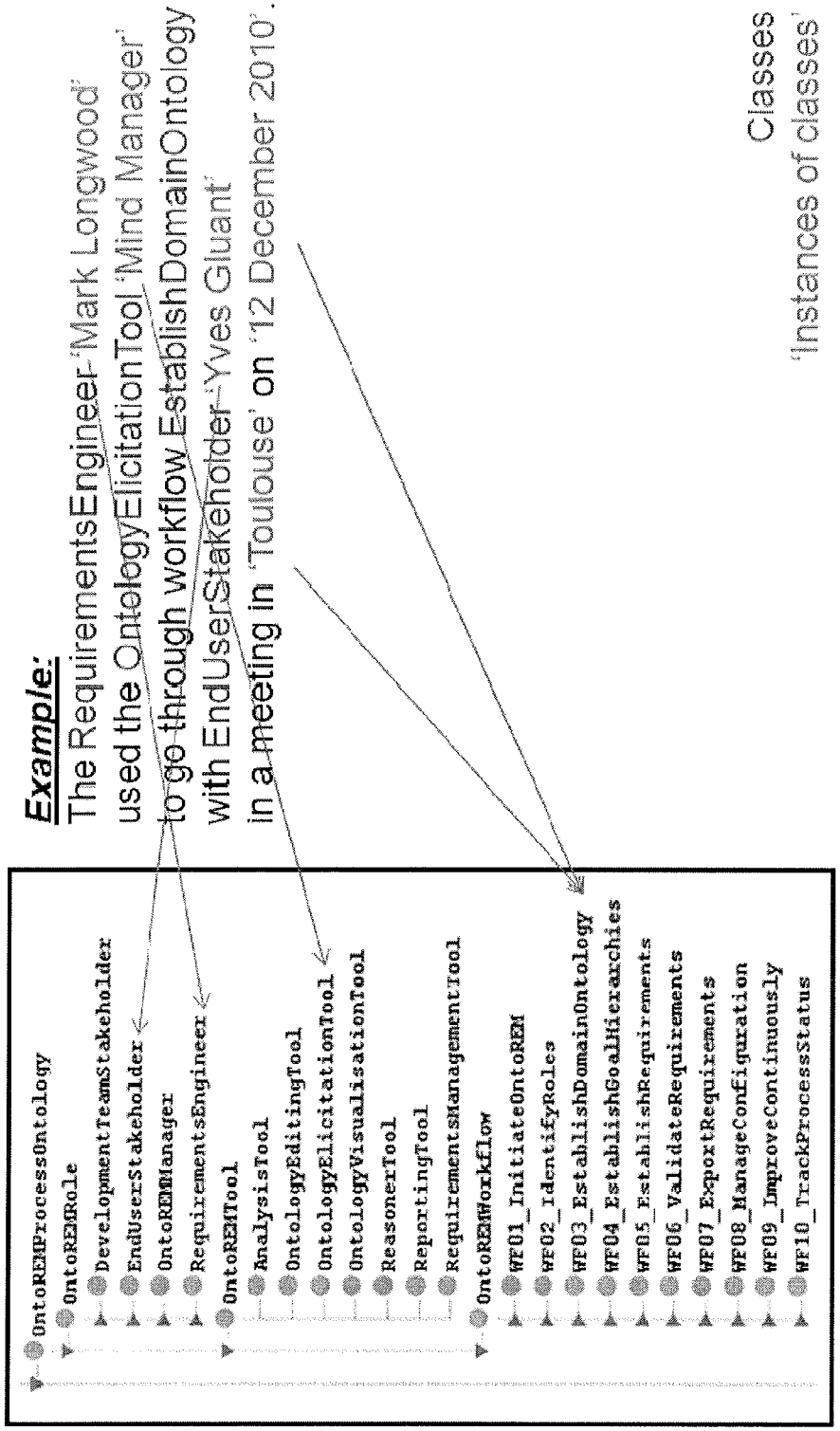
FIG. 11 shows an example of information captured in instances of the metamodel of FIG. 5.

FIG. 11 provides an example of how information can be captured in an instance of the metamodel 20.

Figure 12:
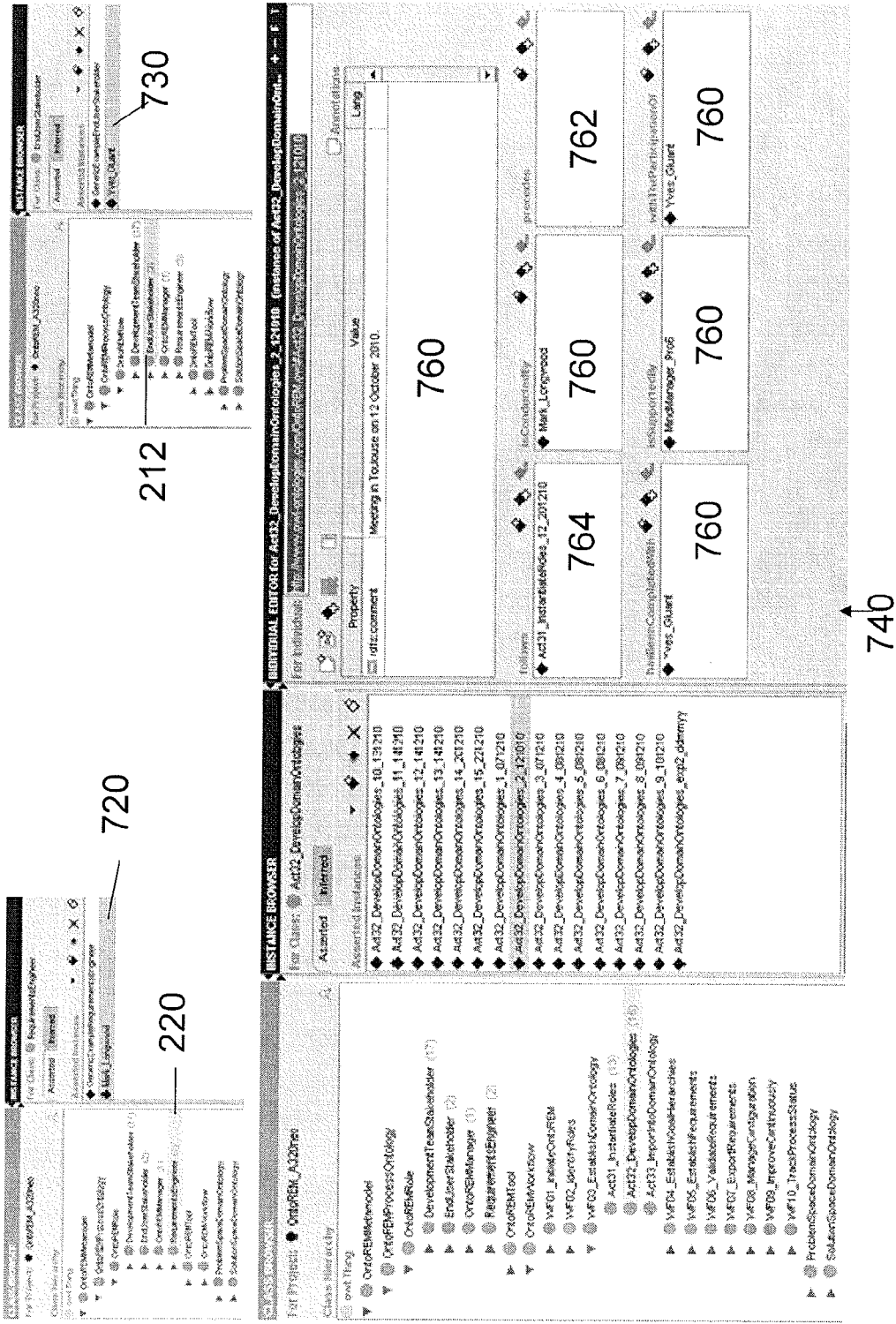
FIG. 12 shows a view of instances of the metamodel of FIG. 5.

FIG. 12 represents the same information as in FIG. 11. In the left upper corner, the completed instance "Mark_Longwood" 720 of the class "Requirements Engineer" 220 is shown; in the right upper corner the instance "Yves_Gluant" 730 of the class "End User Stakeholder" 216 is shown; and finally, the lower screenshot displays the instance 740 of the meeting in Toulouse "Act32_Develop Domain Ontologies_2_121010" of the class "Act32_Develop Domain Ontologies" 276 with the associated widgets 760 on the right.

The widgets 760 show the selected instances of classes that are generically linked to the class of the activity, i.e. the meeting recorded, containing the information that the meeting to develop domain ontologies was conducted by Mark Longwood with Yves Gluant during one meeting in Toulouse on 12 Oct. 2010 (and that this meeting concluded the activity regarding the stakeholder Yves Gluant); and that Mark used the tool MindManager_Pro6 as his ontology elicitation tool.

To populate the metamodel 20 the user is presented with process ontology 200 via the interface and selects a class. The template for each class contains structured information with the fields/widgets linked by predetermined relationships which the user can fill in, in order to populate the metamodel 20. Some widgets will be automatically filled by system 50 when a widget in a related class is filled in. For example the equivalent to the "precedes" widget 762 in the instance for "Act 31_Instantiate Roles_12_201210" will have a reference to "Act 32_Develop Domain Ontologies_2_121010" 740 automatically entered when the "follows" widget 764 of the instance 740 is filled in by a user with a reference to that other instance.

As with the process ontology 200 one or more users are able to select the problem ontology 300 and fill in the appropriate information in the widgets/fields of the metamodel 20 in the structured manner.

Again the user selects the solution ontology and populates the metamodel 20 with the relevant information.

The population of the metamodel 20 can occur by one or more users. In particular an iterative approach may be used with stakeholders identifying their goals and filing in the relevant information.

The problem space ontology 300 and the solution space ontology 400 together, as specified in the metamodel 20, serve as a template to build the domain ontology 14, 16, 18 including domain requirements for any domain or context.

Parts of the metamodel 20 can be used in multiple contexts or several specific application domain ontologies. Existing domain ontologies may be imported and some additional domain ontologies may have to be developed with the relevant stakeholders and domain experts, in case there are no relevant domain ontologies available. If existing domain ontologies are not up-to-date, they can be validated again with the relevant stakeholders and domain experts before they can be re-used.

In use, a user can initiate the workflow process and takes the metamodel 20 for use within a new project. As described above, the metamodel comprises three separate parts and in the instances of a similar domain and/or context, existing art populated problem ontology and/or solution ontology may be used from previous examples of RE modeling. In the first instance, the user identifies the relevant stakeholders and domain experts. Preferably such information includes the name, role title and department of the relevant stakeholders and domain experts. Such information is typically obtained from the organization chart of the relevant organization and/or projects. A user then populates the metamodel 20 with the relevant names and roles of each person identified.

The user can populate the uncompleted templates metamodel 20 in order to establish the completed instances of the problem and solution ontologies 300 and 400. In the first instance, the user may contact the relevant stakeholders and domain experts briefly identified to validate the needed domain ontologies (problem and solution spaces) of the project. Existing domain ontologies may be imported into the metamodel 20.

Once the relevant stakeholders and domain experts have been identified and the widgets in role class 210 completed, the goals hierarchy 420 within the metamodel 20 is constructed. At an initial meeting or any subsequent contact, each individual stakeholder and/or domain expert contributes to the development of goal hierarchies 420 covering both functional goals, non functional soft goals and identifying root goals and root soft goals.

Once the goals have been elicited from the relevant stakeholders and domain experts the resulting goal hierarchies, comprising both the functional goals and non functional soft goals, are analyzed to identify any potential conflicts and duplications based on the information contained in the metamodel. Optionally at this stage the user may negotiate with the relevant stakeholder and/or domain expert any changes in the goals required in order to eliminate duplication and resolve any inconsistencies or conflicts within each goal hierarchy and between several goal hierarchies. Once the goal hierarchies have been validated with the relevant stakeholders and domain experts, this may be imported into the solution space as the instances of goal hierarchy 420.

Figure 13:
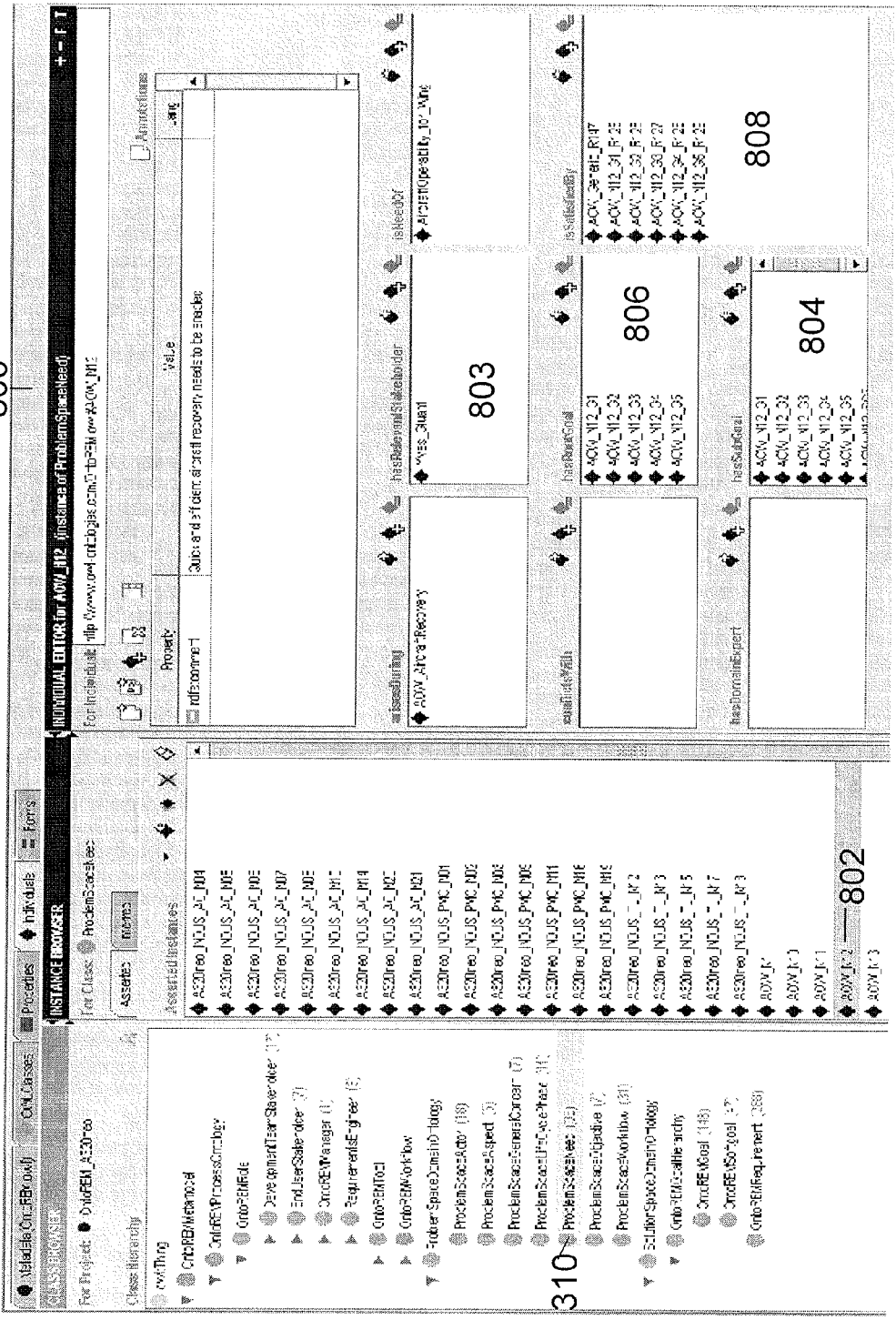
FIG. 13 shows a completed instance the metamodel of FIG. 5 relating to a problem space.

In FIG. 13 is shown a completed instance 800 of the class Problem Space Need 310, i.e. with the template completed. The relevant stakeholder widget 803 indicates that the relevant stakeholder of this need 802 and subsequent goals, soft goals and requirements is Yves Gluant. The need 802 is uniquely identified as AOW_N12 and has led to the development of a goal hierarchy 240 with the goals and soft goals indicated in the "has Sub Goal" widget 804. Also the instance 800 displays the identified root goals in the "has Root Goal" widget 806, as well as the resulting requirements that jointly satisfy this need in the "is Satisfied By" widget 808 (by clicking on any of these with mouse 62, the corresponding requirements template is opened).

Figure 14:
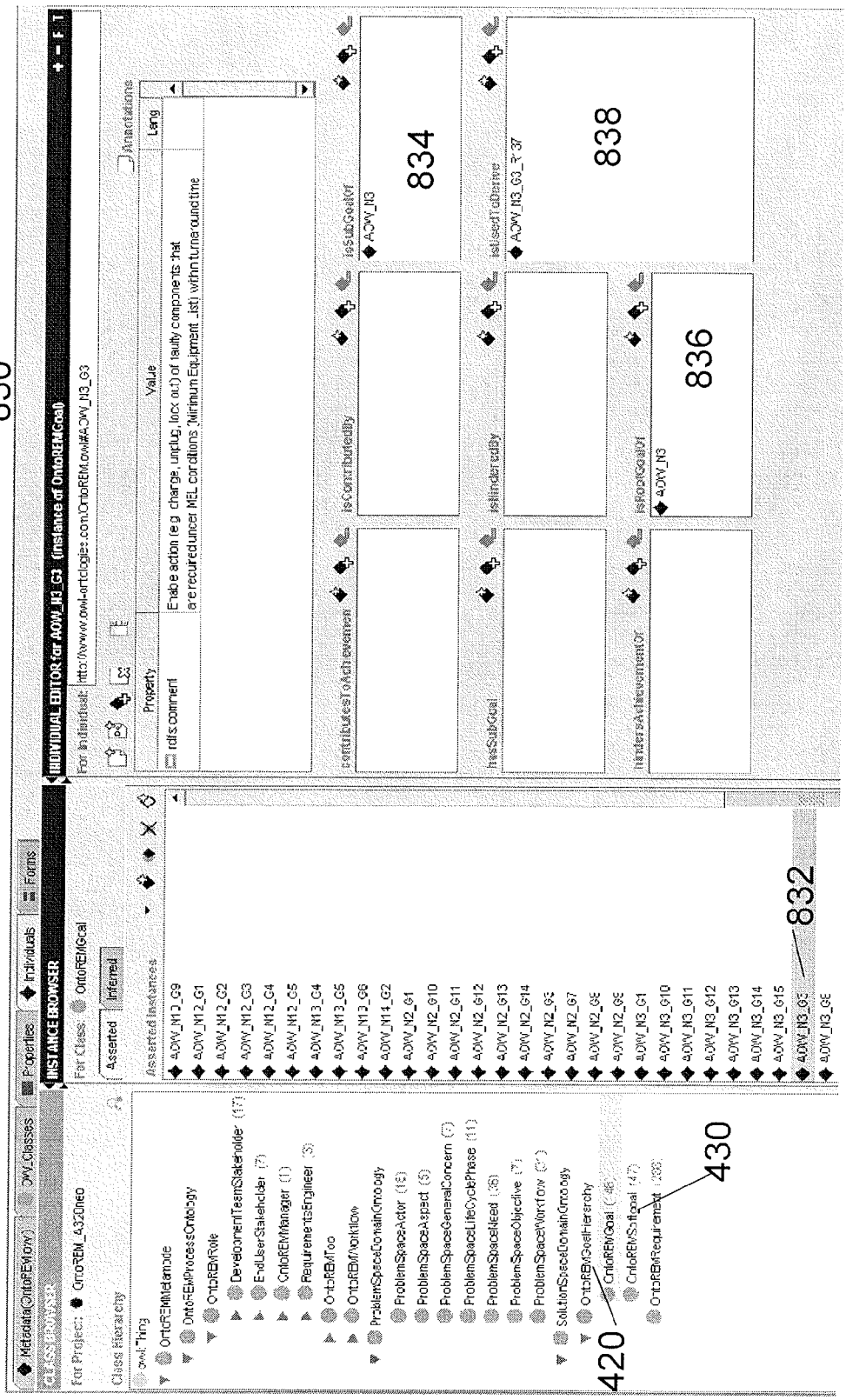
FIG. 14 shows a completed instance the metamodel of FIG. 5 relating to a goal.

In FIG. 14 is shown a completed instance 830 of the goal AOW_N3_G3 832, which is part of the goal hierarchy 420 for the need AOW_N3 as shown in the "is Sub Goal Of" widget 834. The "is Root Goal Of" widget 836, indicates that the AOW_N3_G3 goal 832 is a root goal of the need AOW_N3 and the "is Used To Derive" widget 838 indicates that it led to the development of a requirement AOW_N3_G3_R137 which is an instance of the class "Requirement" 450.

Figure 15:
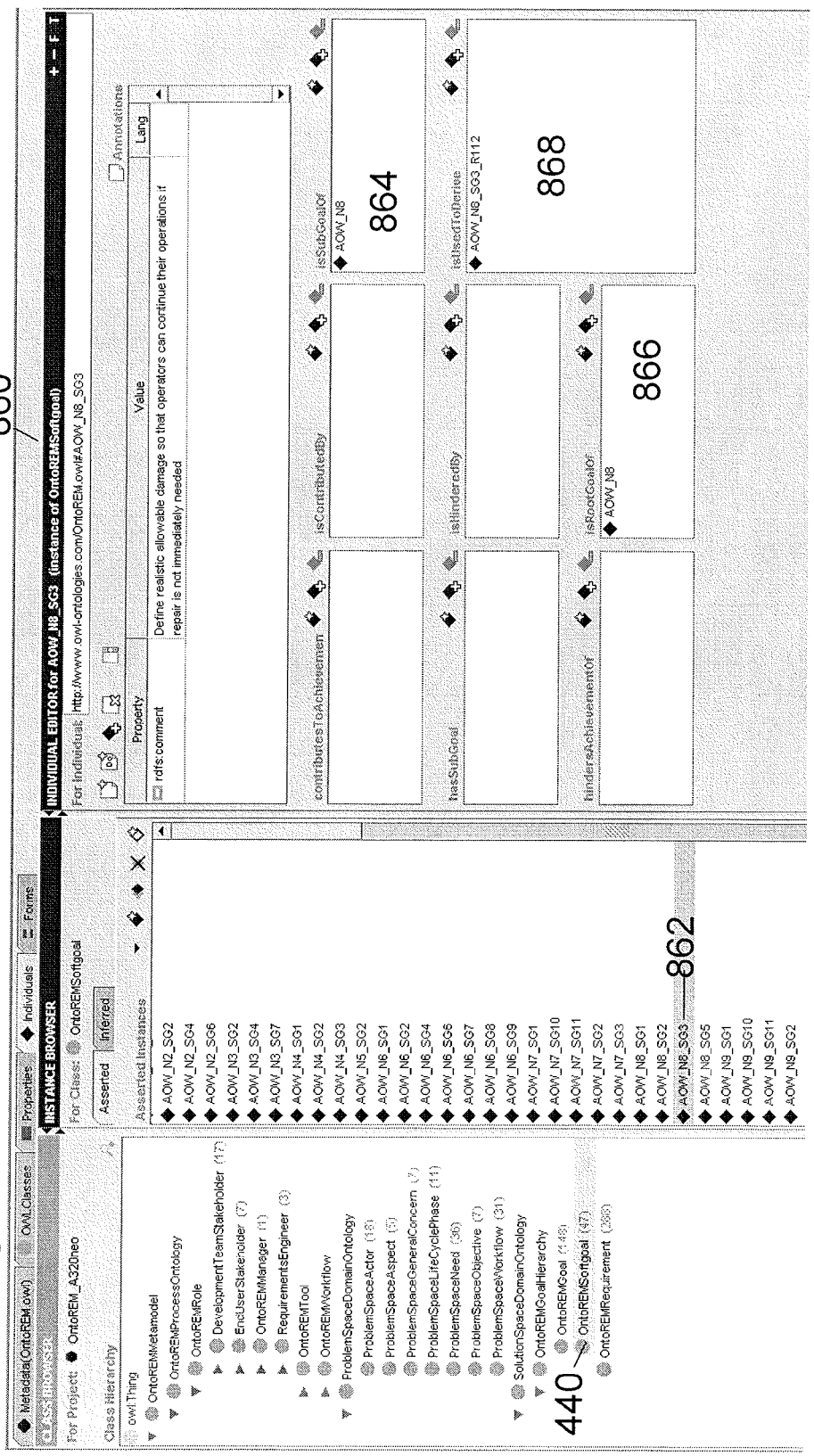
FIG. 15 shows a completed instance the metamodel of FIG. 5 relating to a soft goal.

In FIG. 15 is shown a completed instance 860 of the soft goal AOW_N8_SG3 862, which is part of the goal hierarchy 420 for the need AOW_N8 as shown in the "is Sub Goal Of" widget 864. The "is Root Goal Of" widget 866, indicates that the soft goal AOW_N8_SG3 862 is also a root goal of the need AOW_N8 and the "is Used To Derive" widget 868 indicates that it led to the development of a requirement AOW_N8_SG3_R112 which is an instance of the class "Requirement" 450.

It is possible to reuse previously implemented rule requirements when the situation of a repeated requirement has been identified. The template allows the user to identify each requirement, and also allows the user to easily identify when gaps appear within the knowledge of the user. Gaps in the knowledge of the user are therefore identifiable and can be rectified through negotiation and/or communication with the relevant stakeholders or domain experts. Once the template has been completed, the entire set of derived requirements, both individually and as a set, is analyzed. The analysis occurs at two levels, firstly the goal level (including functional goals and soft goals) and at the requirement level. At the goal level, individual conflicts, duplications and missing goals can be identified and resolved, eliminated or created respectively.

As a separate workflow 278, the user may also establish the requirements for the managed project. The user identifies the rule requirements (including all attributes and available link information) using the template as provided in the metamodel 20. The requirements are analyzed both individually and as a set (i.e. global and local objectives). At this stage, incompleteness of individual requirements can be identified as being incomplete within the metamodel 20. Duplications, inconsistencies and/or conflicts and other requirements are identified.

A user may also validate any domain knowledge that was captured previously in order to develop their requirements. In this case, the user meets with the individual stakeholders and/or domain experts and formally validates either intermediate outputs of the process 12, i.e. needs and goals/softgoals, or the final output, i.e. the entire set of requirements. The metadata therefore allows the identification of gaps in the user requirement and the user can easily identify such gaps and populate them in order to enhance requirements completeness and consistency.

As part of the validation process the software tool OntoRAT 58 can be used which provides a number of significant functionalities that directly support many of the process workflows.

The OntoRAT tool is fully integrated into the software of system 50 and is a very useful and important component of the methodology. OntoRAT 58 enables process status analyses and provides guidance to the requirements engineer, directly in support of many of the process workflows 272. It takes advantage of the fact that the predefined relationships and structure of the metamodel 20 allow for a rule or requirement specification that has been created using it to be searched and for the relationships between completed fields to be analyzed.

By using the knowledge of the structure of the pre-completed metamodel 20 OntoRAT 58 can be used on a completed or partially completed specification to find a/ gaps and missing requirements, b/ duplications and c/ conflicts and also to d/ trace paths between requirements, goals and needs. This traceability from d/ enables information from a/ b/and c/ to be used rapidly and effectively as will be described below. It is particularly useful when conflicts have been found since in order for conflicts between requirements to be resolved it is useful to trace how the conflicting requirements arose and on which needs they were based.

a/ Once the metamodel 20 has been adapted with domain ontologies it sets out all the process steps and activities 274 that should be completed and all of the goals and requirements that should be generated and entered into the pre-defined fields/widgets of the templates to provide all relevant completed instances. OntoRAT 58 uses this information to find gaps where the predefined structure requires an entry but where no entry exists (i.e. an unexpectedly empty widget) and by finding process steps 272/274 that have been initiated but not marked as completed. OntoRAT 58 also allows for customizing the set of underlying attributes when analyzing for completeness at the requirements level.

b/ Duplications. OntoRAT 58 is enabled to read the contents of a given specification (i.e. as inputted into the metamodel 20) and to identify duplications. As well as checking through the instances of all needs, requirements and goals to find those that are worded identically or with overlapping wording using text based mapping techniques, known ontology based matching techniques can used to identify duplications that are duplications in substance but use different wording. For example ontology alignment techniques are used to identify common goals. A common goal may be expressed in a number of different ways which are semantically equivalent but contain entirely different vocabularies. When this occurs a text based matching technique would not identify the duplication. By defining the ontologies (via axiom and classes) duplications can be found. In particular non-case-sensitive exact and free text matches, both at goal and requirements levels (customizable search), based on the relationships that are specified in the problem space domain ontology can be made.

c/ Conflicts. In a similar manner to finding duplication, by defining the ontology used, conflicts between requirements can be found. For example if a given manufactured component is required to be heavy in one part of the requirement specification and light in another. Conflicts can be resolved very early in the process, which is less time-consuming, and therefore less costly.

A further feature of the OntoRAT tool is to automatically compile all domain requirement statements from the available subcomponent information into the pre-defined, harmonized requirement statement structure, when requested by the requirements engineer.

Figure 16:
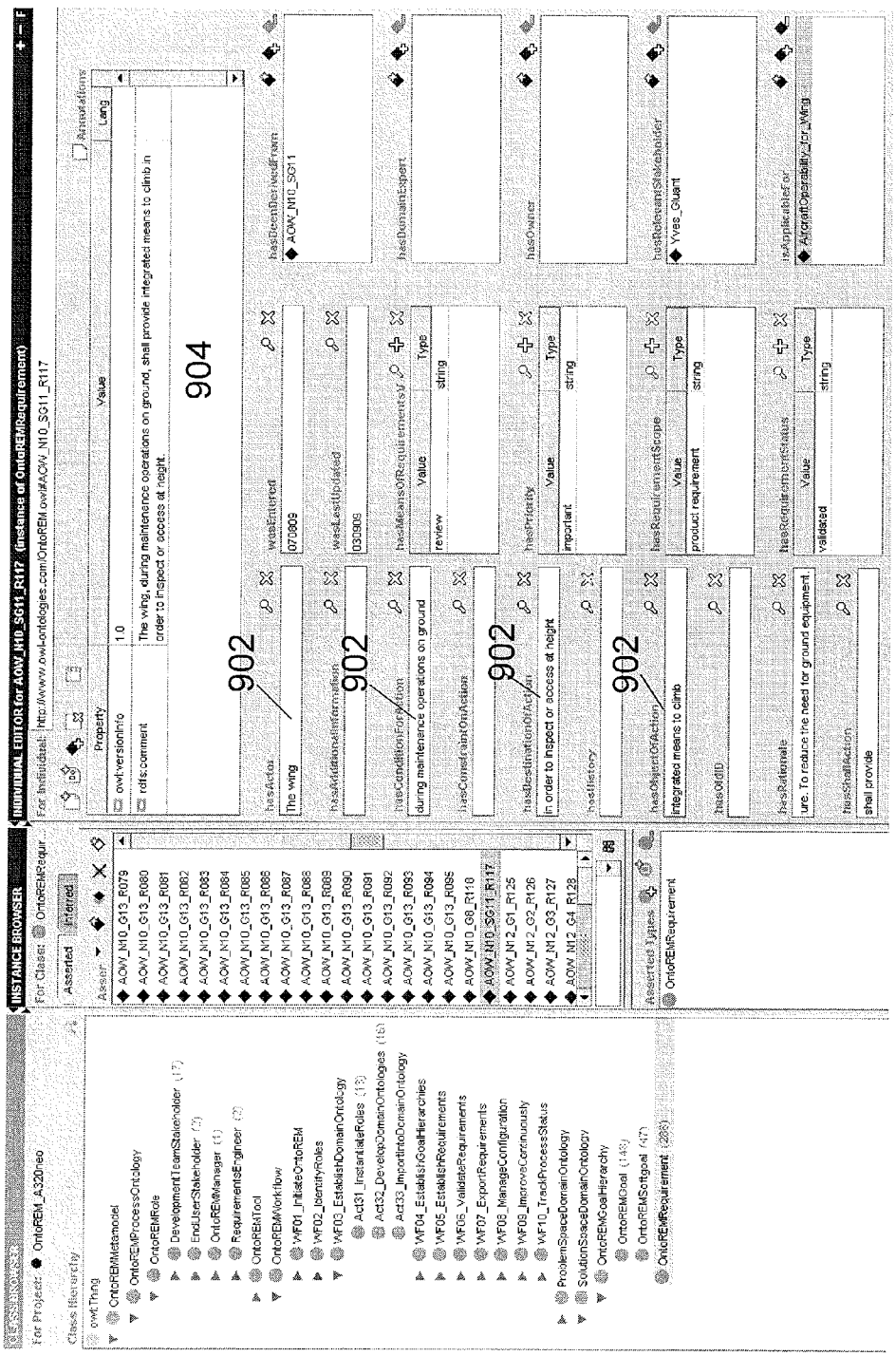
FIG. 16 and shows a completed instance the metamodel of FIG. 5 relating to a requirement.

FIG. 16 shows an instance of a requirement identified as "AOW_N10_SG11_R117". The instance comprises a number of completed widgets including statement component widgets 902. In the top widget 904 the version number of the requirement and a compiled requirement statement are displayed. The statement is on demand compiled automatically by system 50 from the captured statement component information in component widgets 902, so that the statement is in a harmonized and structured format.

Preferably the compilation of domain requirements is carried out in this manner. However, re-used requirements that have been developed and validated outside system 50 and/or process 12 can be left unchanged, i.e. they are not compiled. Once compiled all domain requirements including associated attributes and link information can be easily exported into a spreadsheet suing known exporting programs.

d. Traceability. OntoRAT 58 enables the display onto computer display 59 of both the linked needs/goals and the requirements derived from those goals (termed "forward traceability") and requirements with the root goals from which they were derived and their underlying need(s) ("backwards traceability"). The presentation of such information allows the user to easily understand why specific requirements are necessary and how they were developed, which greatly enhances the requirements validation workflow. In particular the ultimate goals, or subsequent needs, can be cognitively understood. Further conflicts can be resolved by finding the source of the requirements and from them determining what can be changed and also to determine the importance of each of the conflicting requirement in meeting the initial needs.

Figure 17:
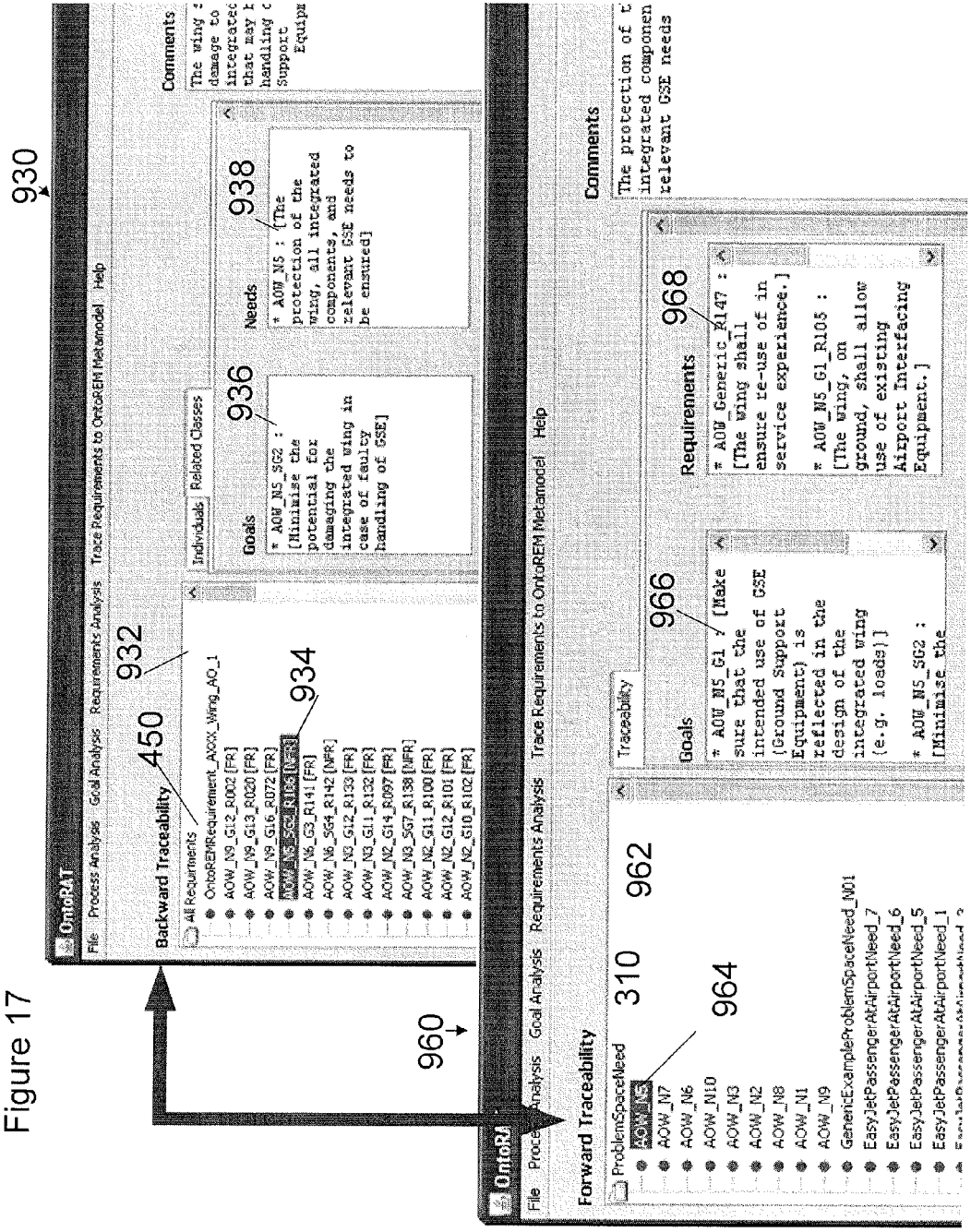
FIG. 17 shows views of traceability capabilities of an OntoRAT tool.

In FIG. 17 is shown an example of a backward traceability view 930 produced by the OntoRAT tool 58. The instances making up the Requirement class 450 are listed in section 932. As can be seen a particular requirement 934 in section 932 is selected and the goal from which it was derived is listed in goal section 936. Similarly the underlying need is shown in need section 938. In both cases the title of the need/goal is accompanied by the complied statement to save the user form having to enter other instances to find a description of them. FIG. 17 also shows an example of a forward traceability view 960 produced by the OntoRAT tool 58. The instances making up the Problem Space Need class 310 are listed in section 962. As can be seen a particular need 964 in section 962 is selected and the goals derived from it are listed in goal section 966. Similarly the requirements indirectly derived from it are shown in need section 968.

These views are made possible by the provision of the relevant widgets in the metamodel 20 (such as widgets 804, 806, 834, 836 and 838) and by ensuring that each of them contains information (which in itself can be achieved by using OntoRAT 58 as described above).

OntoRAT 58 may also be configured to produce reports of a macroscopic view of a/b/c/ and d/ as well as answering individual queries. Reports can be generated regarding the traceability and completeness of the solution space based on the available knowledge in the problem space of the application domain e.g. listing the percentage of goals which have a full set of derived requirements.

The invention claimed is:

1. A computer system comprising a processor and memory, wherein the system is programmed to provide a first metamodel comprising a plurality of predefined fields relating to requirements engineering wherein the predefined fields of the metamodel define the requirements and goals in a requirement engineering process thereby providing a framework for the inputting of data, and ontological relationships between at least some of the predefined data entry fields in the metamodel and to store one or more further metamodels and the ontological relationships in the memory, and to enable a user to enter information into one or more of the predefined fields of the first metamodel and the computer system configured to identify one or more instances of a previously completed predefined field having the same ontological relationship in a metamodel stored in the memory, and automatically entering the information in the predefined field of the first metamodel in order to enable the automatic generation of one or more of: a requirements specification and the steps for creating a requirements specification, wherein the automatically generated requirements specification or steps for creating the requirements specification are based on the information entered into the predefined fields.

2. The computer system according to claim 1 wherein the system is programmed to prompt, a user to enter information into the predefined fields in order to create one or more of: a requirements specification and the steps for creating a requirements specification.

3. The computer system according to claim 1 wherein the metamodel comprises a plurality of templates for the creation of an instance, each template for an instance comprising at least two predefined fields.

4. The computer system according to claim 2 wherein the metamodel comprises a plurality of predefined classes, each class comprising a template for the creations of instances, the system programmed to prompt a user to create a plurality of instances for each class using the template of that class.

5. The computer system according to claim 4 wherein each instance of the same class contain at least two predefined fields which relating to the same aspects of requirements engineering and are common to the template belonging to that class.

6. The computer system according to claim 3 wherein templates of different classes contain one or more predefined fields which relate to different aspects of requirements engineering.

7. The computer system according to claim 4 wherein the metamodel comprises at least one class comprising a plurality of sub classes, each sub class having a different template for the creation of instances.

8. The computer system according to claim 4 wherein the metamodel comprises at least one hierarchy of classes comprising a parent class and child class, wherein the system is programmed to enable a user to create instances for each child class which is derived from an instance of a parent class.

9. The computer system according to claim 3 wherein the relationships include a relationship between a field of a first template of a first class and at least a portion of a second different class.

10. The computer system according to claim 9 wherein the portion of the second class comprises a predefined field of a second template, which second template belongs to the second class.

11. The computer system according to claim 2 wherein the system is programmed to prompt a user to enter a reference to one of: a second instance and a completed predefined field of a second instance into a first predefined field of a first instance.

12. The computer system according to claim 11 wherein the first and second instances are built from different templates/belong to different classes.

13. The computer system according to claim 11 wherein the system is programmed to automatically enter information into a field in the second instance in response to the user entering the reference in the first predefined field of the first instance.

14. The computer system according to claim 4 wherein at least one class relates to roles of people involved in requirement engineering.

15. The computer system according to claim 14 wherein the class relating to roles comprises a least two sub classes stating predefined roles, each sub class having a different template for the creation of instances.

16. The computer system according to claim 15 the predefined roles including one or more of: development team stakeholder, end user stakeholder, requirements engineer and ontology manager.

17. The computer system according to claim 16 wherein the user is prompted to create different numbers of instances for different roles.

18. The computer system according to claim 4 wherein at least one class relates to steps for creating a requirements specification.

19. The computer system according to claim 18 wherein the class that relates to steps for creating a requirements specification comprises sub classes of predefined workflows.

20. The computer system according to claim 19 the predefined workflows comprising sub classes of predefined activities each sub class having a different template for the creation of instances.

21. The computer system according to claim 4 wherein at least one class relates to a solution space relating to a requirement specification.

22. The computer system according to claim 21 wherein a hierarchy of classes, comprising a parent class and child class, relates to the solution space relating to a requirement specification, wherein the system is programmed to enable a user to create instances for each child class which is derived from an instance of a parent class and the classes in the hierarchy includes one or more of: goals, soft goals and requirements.

23. The computer system according to claim 22 wherein at least some of the predefined fields of the template of the requirements child class when completed by at least one user make up at least part of the requirement specification.

24. The computer system according to claim 22 wherein the template for the creation of instances of goals or soft goals comprises a predefined field which has a relationship with a different template and for which a user is prompted to enter a reference to a specific instance of the requirement sub class which is derived from that instance of goal or soft goal.

25. The computer system according to claim 22 wherein goals are functional and soft goals are non-functional.

26. The computer system according to claim 4 wherein at least one class relates to a problem space relating to a requirement specification.

27. The computer system according to claim 26 wherein the at least one class relating to a problem space comprises sub classes relating to needs of the requirement engineering, each sub class having a different template for the creation of instances.

28. The computer system according to claim 27 wherein a template for the creation of instances of a goal or a soft goal comprises a predefined field which has a relationship with a different template and for which a user is prompted to enter a reference to a specific instance of the need sub class from which that instance of goal is derived.

29. The computer system according to claim 1 wherein predefined fields are semantically linked within the metamodel by means of one or more of object and datatype properties.

30. The computer system according to claim 29 wherein the property of at least one field constrains the type of information that a user can enter into that field.

31. The computer system according to claim 30 wherein the property of at least one field constrains which instances can be referenced by a user in that field.

32. The computer system according to claim 1 programmed to receive an ontology relating to at least one domain or topic, and to adapt one or more predefined field or ontological relationship based on the received ontology.

33. A non-transitory computer readable storage medium containing computer executable instructions which, when executed on computer apparatus, cause the computer apparatus to:

access a first metamodel comprising a plurality of predefined data entry fields relating to requirements engineering wherein the predefined fields of the metamodel define the requirements and goals in a requirement engineering process thereby providing a framework for the inputting of data, ontological relationships between at least some of the predefined fields in the metamodel and to store one or more further metamodels and the ontological relationships in the memory, and information entered into one or more of the predefined fields of the first metamodel, wherein the apparatus is configured to identify one or more instances of a previously completed predefined field having the same ontological relationship in a metamodel stored in the memory, and automatically entering the information in the predefined field of the first metamodel to enable the automatic generation of one or more instances which form at least part of one or more of: a requirements specification and the steps for creating a requirements specification;

and automatically compile at least part of a requirements specification from information entered into a set of the predefined fields.

34. A computer enabled method, the method comprising the steps of:

populating a metamodel, and creating a requirements specification using the metamodel, wherein the first metamodel comprises a plurality of predefined data entry fields relating to requirements engineering wherein the predefined fields of the metamodel define the requirements and goals in a requirement engineering process thereby providing a framework for the inputting of data, and ontological relationships between at least some of the predefined fields in the metamodel and to store one or more further metamodels and the ontological relationships in the memory.

* * * * *